(12) United States Patent
Wachi (10) Patent No.: US 6,924,857 B2
(45) Date of Patent: Aug. 2, 2005

(54) COLOR FILTER BOARD AND MANUFACTURING METHOD THEREOF, LIQUID CRYSTAL DISPLAY PANEL, AND ELECTRONIC EQUIPMENT

(75) Inventor: Reiko Wachi, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/337,259

(22) Filed: Jan. 6, 2003

(65) Prior Publication Data

US 2003/0147026 A1 Aug. 7, 2003

(30) Foreign Application Priority Data

Jan. 16, 2002 (JP) .......................... 2002-007184

(51) Int. Cl.⁷ .................... G02F 1/1335; G02F 1/1333
(52) U.S. Cl. ........................ 349/106; 349/112
(58) Field of Search ......................... 349/106

(56) References Cited

U.S. PATENT DOCUMENTS

| | | | | |
|---|---|---|---|---|
| 5,861,930 A | * | 1/1999 | Sakai ........................ | 349/106 |
| 6,130,736 A | * | 10/2000 | Sasaki et al. ............... | 349/122 |
| 6,193,908 B1 | * | 2/2001 | Hampden-Smith et al. ...... | 252/301.4 R |
| 6,309,783 B1 | * | 10/2001 | Shiba et al. .................. | 430/7 |
| 6,515,649 B1 | * | 2/2003 | Albert et al. ............... | 345/107 |
| 6,525,791 B1 | * | 2/2003 | Tsuda et al. ............... | 349/106 |
| 6,529,255 B1 | * | 3/2003 | Sekiguchi .................. | 349/113 |
| 6,607,873 B2 | * | 8/2003 | Chari et al. ................ | 430/511 |
| 6,645,281 B2 | * | 11/2003 | Yabuki et al. ............. | 106/31.27 |

FOREIGN PATENT DOCUMENTS

| | | |
|---|---|---|
| JP | 11-231516 | 8/1999 |
| JP | 2000-066188 | 3/2000 |
| JP | 2001-033778 | 2/2001 |
| JP | 2001-242451 | 9/2001 |
| JP | 2001-330822 | 11/2001 |
| JP | 2002-006299 | 1/2002 |

OTHER PUBLICATIONS

Communication from Japanese Patent Office re: counterpart application.

* cited by examiner

Primary Examiner—Kenneth Parker
(74) Attorney, Agent, or Firm—Harness, Dickey & Pierce, P.L.C.

(57) ABSTRACT

Color filters are disposed over a substrate so as to transmit light of a wavelength corresponding to a specified color, and an inner surface of each color filter is a rough surface having ridges and valleys. Further, pigment particle groups in each of which a plurality of pigment particles are aggregated are dispersed in each color filter.

18 Claims, 11 Drawing Sheets

QUANTITY OF ADDITION OF DISPERSANT

FIG. 7

QUANTITY OF ADDITION OF DISPERSANT (wt%)

COLOR FILTER BOARD AND MANUFACTURING METHOD THEREOF, LIQUID CRYSTAL DISPLAY PANEL, AND ELECTRONIC EQUIPMENT

DETAILED DESCRIPTION OF THE INVENTION

1. Technical Field of the Art

The present invention relates to a liquid crystal display panel and electronic equipment employing the same, and more particularly to a color filter board for use in a liquid crystal display panel and a method of manufacturing the same.

2. Related Art

In general, a liquid crystal display panel of a so-called "reflection type" is constructed having a reflection layer on a rear side one of a pair of substrates between which a liquid crystal is sandwiched. With this construction, sunlight or the like (i.e., external light) entering the liquid crystal display panel from an observation side proceeds from the observation side one of the pair of substrates to the inner surface of the reflection layer after being transmitted through the liquid crystal, and the light exits from the observation side after being reflected from the inner surface. The exiting light is visually recognized by an observer, whereby reflection type display is realized. Since the liquid crystal display panel of the reflection type does not require a light source such as a backlight, it has the advantage that low power consumption and a thin structure can be attained.

Further, in recent years, a liquid crystal display panel wherein a reflection layer is provided with openings has also been proposed. According to the liquid crystal display panel of such a construction, so-called "transmission type display" can be performed in addition to the above reflection type display in such a way that light entering from a rear side of the panel (for example, light projected by a backlighting unit) is caused to exit from the observation side via openings in the reflection layer. The liquid crystal display panel of this type is called a "semitransmissive reflection type", and it has the advantage that the visibility of a display can be ensured by the transmission type display even in an environment of insufficient external light.

Here, in a case where the inner surface of the reflection layer employed in each of the above liquid crystal display panels is mirror-finished, the light entering from the observation side is visually recognized by the observer after being mirror-reflected from the inner surface of the reflection layer. Therefore, not only an image which ought to be displayed, but also the image of a person or a thing nearby is visually recognized by the observer (hereinbelow, this phenomenon shall be called the "mirroring of a background"), resulting in the problem that the display becomes difficult to see.

In order to avoid the mirroring of the background and attain a good display quality, there has been proposed a construction wherein a reflection layer whose inner surface is roughened is employed so as to scatter light exiting from the observation side after being reflected from the inner surface. In a case, for example, where the substrate on the rear side is formed with minute rugged parts made of a resin material or the like, and where the reflection layer in the shape of a thin film is disposed so as to cover the rugged parts, the inner surface of the reflection layer is formed with a scattering structure conforming to the rugged parts of the inner surface of the substrate.

In the case of forming the scattering structure by this method, however, it is necessary to perform the steps of first forming a layer made of the resin material on the rear side substrate, subsequently patterning the resin layer, so as to form the minute rugged parts, and thereby forming the reflection layer on the substrate, and it has been an actual situation that the reduction of the complication of a manufacturing process or the increase of a cost is limited.

The present invention has been made in view of the circumstances explained above, and it has as an object to provide a liquid crystal display panel in which light for use in display can be scattered by a simple construction, electronic equipment which employs the liquid crystal display panel, and a color filter board for use in the liquid crystal display panel and a method of manufacturing the same.

SUMMARY OF THE INVENTION

In order to solve the above problem, a color filter board according to the present invention is characterized by comprising one of a pair of substrates which oppose each other, and between which a liquid crystal is sandwiched, and color filters which are disposed over said one substrate so as to transmit light of wavelengths corresponding to specified colors. One of these substrates has an inner surface that is a rough surface having ridges and valleys, and contains particle groups having a plurality of aggregated particles. According to the color filter board, light entering the color filter is scattered by the particle groups, and is further scattered by the rough surface of the inner surface of the color filter. Meanwhile, the construction for scattering the light is obtained simultaneously with the formation of the color filter, and hence, it is unnecessary to separately form members for scattering light (for example, rugged parts in the inner surface of a reflection layer, and a scattering plate). Accordingly, the present invention brings forth the advantage that the light can be sufficiently scattered by a simple construction.

By the way, in the color filter board, each of the particle groups should desirably include a plurality of pigment particles which correspond to the color of the correspondent color filter, and which are aggregated. Thus, the construction can attain the simplification of a manufacturing process and the curtailment of a manufacturing cost as compared with a construction wherein particle groups distinct from pigment particles are dispersed in color filters. The color filter board, however, may well be constructed so that particle groups in each of which particles separate from the pigment particles are aggregated are dispersed in the color filters. As the particles in this case, it is preferred to use particles which are made of, for example, an acrylic resin material or an inorganic oxide such as $SiO_2$ or ITO (Indium Tin Oxide). In the case where the particle groups separate from the pigment particles are dispersed in the color filters in this manner, (1) the pigment particles may be uniformly dispersed in the color filters, or (2) the pigment particles may well be aggregated conjointly with the particle groups. When the construction (2) is adopted, more intense scattering is attained than in case of adopting the construction (1). Which of the constructions (1) and (2) is to be adopted, should desirably be properly selected in accordance with the intended use of a liquid crystal display panel, the required degree of the scattering, or the like.

The color filter board can be employed as the substrate of a liquid crystal display panel of reflection type or semitransmissive reflection type. More specifically, in a case where the color filter board is employed as the substrate located on the rear side, in the pair of substrates constituting the liquid crystal display panel, it may be constructed so that a reflection layer for reflecting light entering from the side of the other substrate is disposed on one substrate referred to above, and that the color filters are disposed on the inner surface of the reflection layer. However, the color filter board according to the present invention can be utilized, not only as the substrate on the rear side of the liquid crystal display panel, but also as the substrate on the observation side. When, in this manner, the color filter board according to the present invention is applied to the liquid crystal display panel having the reflection layer, the mirroring of the background attributed to the mirror surface reflection from the inner surface of the reflection layer can be avoided to attain a good display quality.

Also, in order to solve the above problem, a liquid crystal display panel according to the present invention is characterized by comprising a pair of substrates which oppose each other, and between which a liquid crystal is sandwiched; and color filters which are disposed over one of said pair of substrates so as to transmit light of wavelengths corresponding to specified colors, one of the color filters has an inner surface that is a rough surface having ridges and valleys, and in each of which particle groups each having a plurality of aggregated particles are dispersed. According to the liquid crystal display panel, light entering the color filter is scattered by the particle groups, and is further scattered by the rough surface of the inner surface of the color filter. Meanwhile, the construction for scattering the light is obtained simultaneously with the formation of the color filter, and hence, it is unnecessary to separately form members for scattering light. Accordingly, the present invention has the advantage that the light can be scattered by a simple construction. Also in the liquid crystal display panel, as in the color filter board stated above, either a plurality of pigment particles corresponding to the color of the correspondent color filter and being aggregated, or particles being separate from the pigment particles and being aggregated can be used as each of the particle groups dispersed in the color filter.

Incidentally, a liquid crystal display panel of reflection type or semitransmissive reflection type is considered as the liquid crystal display panel to which the present invention is applied. More specifically, the liquid crystal display panel may well be constructed so that one of the substrates as is provided with the color filters is employed as a substrate on an observation side, while a reflection layer for reflecting light entering from the side of one substrate is disposed on the other substrate. Alternatively, the liquid crystal display panel may well be constructed so that one of the substrates provided with the color filters is employed as a substrate on a rear side, while a reflection layer for reflecting light entering from the other substrate is disposed on the rear substrate. In this case, the color filters are located on the observation side with respect to the reflection layer. According to each of the liquid crystal display panels, light exiting from the observation side can be scattered, not only by the particle groups of the color filters, but also by the rough surfaces of the inner surfaces of the color filters, so that the mirroring of the background attributed to the mirror surface reflection from the inner surface of the reflection layer can be effectively avoided. In the liquid crystal display panel which includes the reflection layer, this reflection layer may well be provided with openings through which light entering from the rear side is transmitted from the observation side. Thus, it is possible to realize, not only reflection type display, but also transmission type display.

Also, an electronic equipment according to the present invention is characterized by comprising the liquid crystal display panel stated above. As stated above, the liquid crystal display panel according to the present invention can scatter light for use in display, by a simple construction, so that it is especially suited to an electronic equipment of which a good display quality and the simplification of a manufacturing process are required. Incidentally, a personal computer or a portable telephone, for example, is considered as such an electronic equipment. Needless to say, however, electronic equipment to which the present invention is applicable are not restricted thereto, but the present invention is applicable to various electronic equipment which have a liquid crystal display panel as a display unit.

In order to solve the problem, the present invention consists of a method of manufacturing a color filter board having one of a pair of substrates between which a liquid crystal is sandwiched, and color filters which transmit light of specified wavelengths; characterized by comprising the first step of forming the color filters over said one substrate by the use of a color filter forming composite which includes particle groups each having a plurality of aggregated particles; and the second step of shaping an inner surface of each of the color filters formed by said first step, into a rough surface which has ridges and valleys. According to this method, a structure for scattering light can be formed simultaneously with the formation of the color filters, so that the simplification of a manufacturing process and the curtailment of a manufacturing cost can be attained when the method is compared with a case where members for scattering light are formed separately from color filters. It is considered that, at said second step, a plurality of regions in the inner surface of each of the color filters formed by said first step are removed, thereby shaping the inner surface of said each color filter into the rough surface which has the valleys corresponding to the respective regions and the ridges corresponding to regions other than said respective regions. However, a method of manufacturing the color filter according to the present invention is not restricted to this method.

DETAILED DESCRIPTION OF THE PREFERRED EMBODIMENTS

Now, embodiments of the present invention will be described with reference to the drawings. Such embodiments illustrate aspects of the present invention, they do not restrict this invention, and they can be altered at will within the scope of the present invention. By the way, in the drawings to be referred to below, individual layers and individual members have respectively different reduced scales for the purpose of making them large enough to be recognized on the drawings.

First Embodiment

Construction of Liquid Crystal Display Panel

Figure 1:
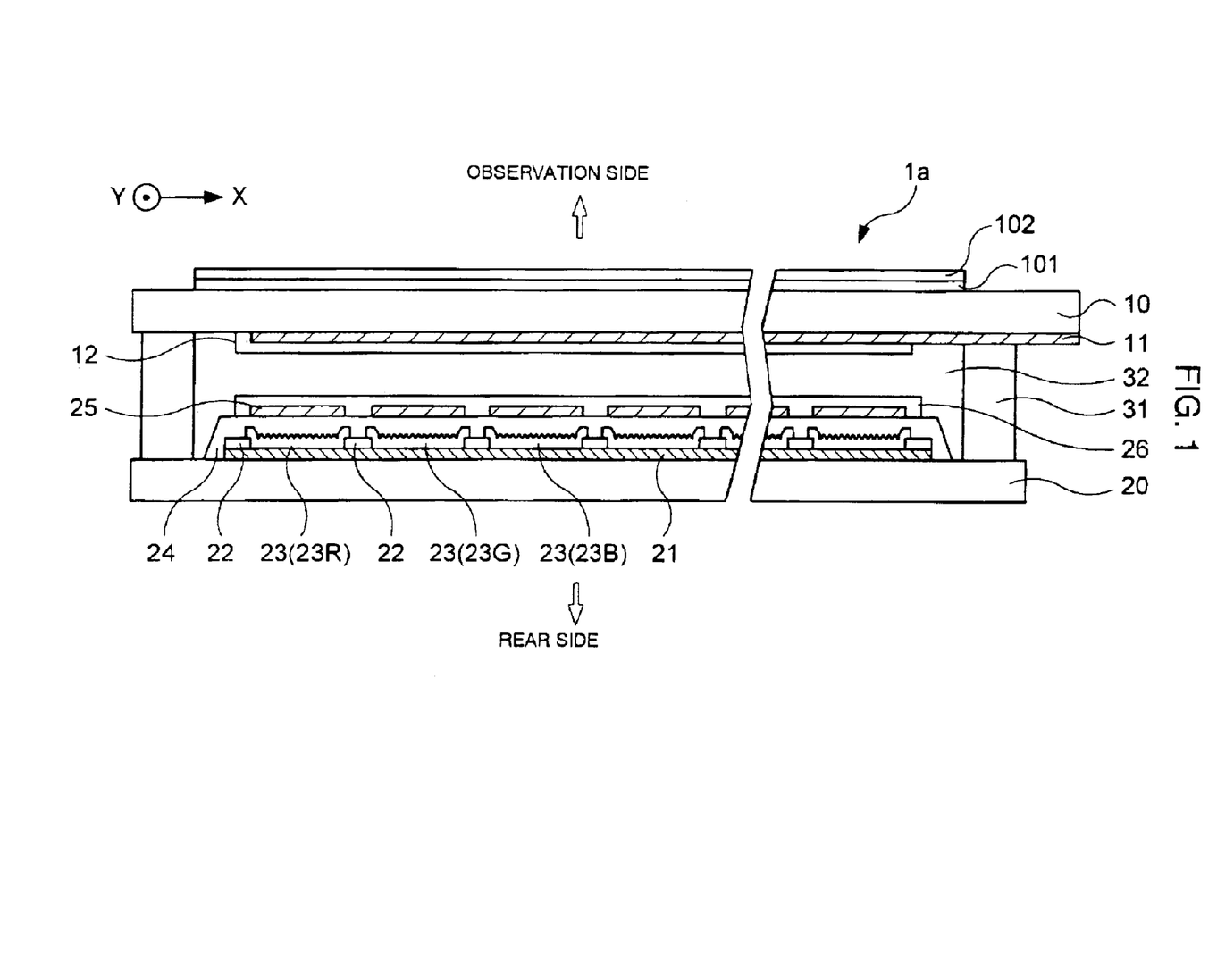
FIG. 1 is a cross sectional view showing the construction of a liquid crystal display panel according to the first embodiment of the present invention.

In the first place, the first embodiment in which the present invention is applied to a reflection type liquid crystal display panel of a passive matrix scheme will be described with reference to FIG. 1. As shown in the figure, the liquid crystal display panel 1a is constructed so that a first substrate 10 and a second substrate 20 opposing each other are held together with a sealing member 31, and that a liquid crystal 32 of, for example, TN (Twisted Nematic) type or STN (Super Twisted Nematic) type is enclosed in a region which is surrounded with both the substrates and the sealing member 31. In the ensuing description, as indicated in FIG. 1, the side of the first substrate 10 with respect to the liquid crystal 32 is expressed as the "observation side". That is, this side signifies the side on which an observer visually recognizes an image displayed by the liquid crystal display panel 1a. On the other hand, the side of the second substrate 20 with respect to the liquid crystal 32 is expressed as the "rear side".

Figure 2:
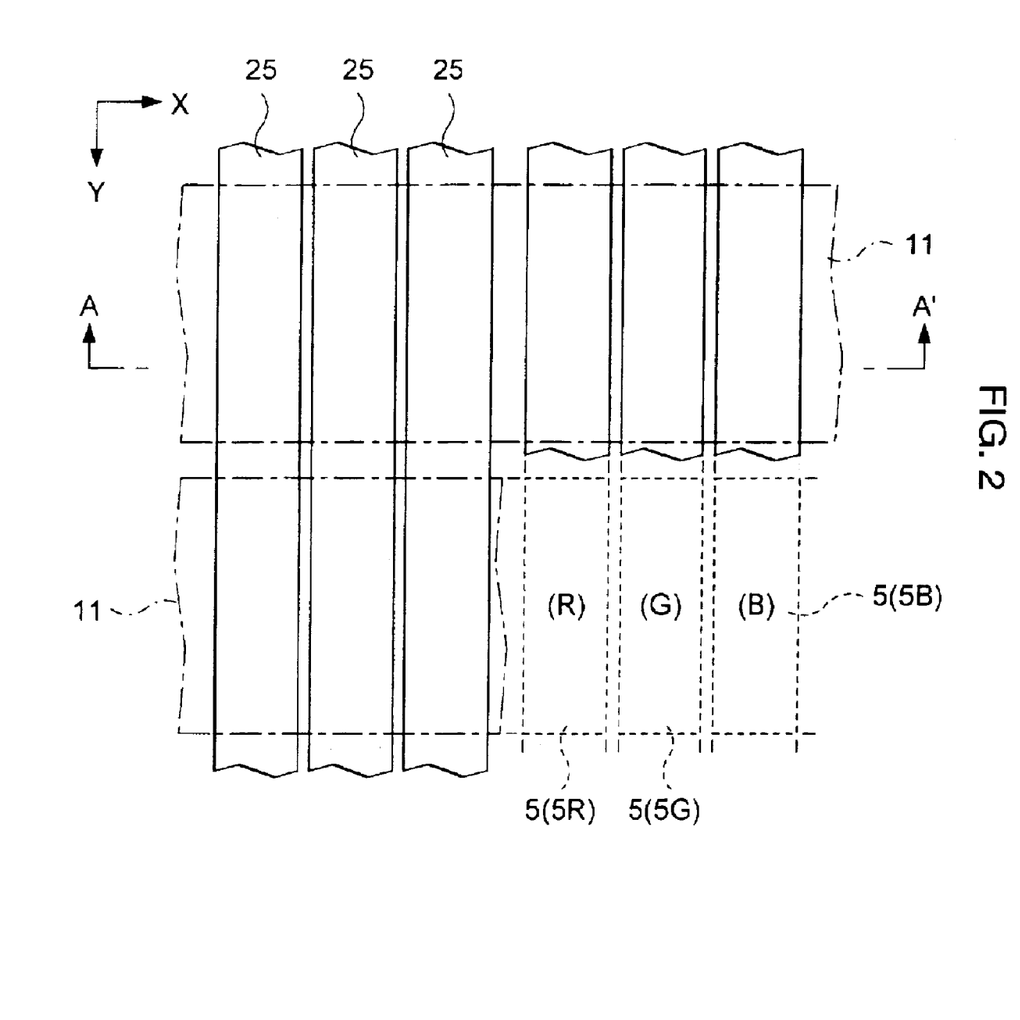
FIG. 2 is a plan view showing the construction of portions of the liquid crystal display panel.

The first substrate 10 and the second substrate 20 are light-transmissive flat members which are made of glass, quartz, plastics or the like. A phase difference plate 101 for compensating interference colors, and a polarization plate 102 for polarizing incident light are bonded on the outer surface (remote from the liquid crystal 32) of the first substrate 10 which lies on the observation side. On the other hand, a plurality of common electrodes 11 are formed on the surface of the first substrate 10 opposing the liquid crystal 32. Here, FIG. 2 is a plan view showing the electrode construction of the liquid crystal display panel 1a. A section viewed from a line A–A' in FIG. 2 corresponds to FIG. 1. As shown in FIGS. 1 and 2, each of the common electrodes 11 is a belt-shaped electrode which extends in a direction X, and is formed of a transparent conductive material, for example, ITO (Indium Tin Oxide).

Meanwhile, a plurality of segment electrodes 25 are disposed over the surface of the second substrate 20. Each of the segment electrodes 25 is a belt-shaped electrode formed of the transparent conductive material such as ITO, likewise to the common electrode 11, and extends in a direction intersecting with the common electrode 11 (that is, in a direction Y in the figures), as shown in FIGS. 1 and 2. As shown in FIG. 1, the common electrodes 11 and the segment electrodes 25 are respectively covered with orientation films 12 and 26. The orientation films 12 and 26 are organic thin films formed of, for example, polyimide, and they have been subjected to rubbing for stipulating the orientation direction of the liquid crystal 32 in the case where no voltage is applied thereto.

The liquid crystal 32 sandwiched in between the first substrate 10 and the second substrate 20 has its orientation direction changed in accordance with voltages applied between the common electrodes 11 and the segment electrodes 25. In the ensuing description, a region where the common electrode 11 and the segment electrode 25 oppose each other is expressed as a "sub pixel 5" as shown at a right lower part in FIG. 2. That is, the sub pixel 5 can be said the minimum unit of a region in which the orientation direction of the liquid crystal 32 changes in accordance with the application of the voltage. As shown in FIG. 2, a plurality of sub pixels 5 are arrayed in the shape of a matrix in the X direction and the Y direction, and each of them corresponds to any of red (R), green (G) and blue (B). Thus, one pixel (dot) corresponding to the minimum unit of a display image is constructed of a set which consists of the sub pixels 5R, 5G and 5B corresponding to the three colors.

Referring to FIG. 1 again, a reflection layer 21, a light shield layer 22, color filters 23 and an overcoat layer 24 are disposed on the surface of the second substrate 20 opposing the liquid crystal 32, and in the order as viewed from the inner surface of the second substrate 20. Among them, the reflection layer 21 is a thin film which is formed of, for example, a metal such as aluminum or silver, or an alloy mainly constituted by the metal, and it has a light reflectivity. Sunlight, indoor illumination light, or the like (i.e., external light) entering the liquid crystal display panel 1a from the observation side is transmitted through the first substrate 10 and the liquid crystal 32 to reach the reflection layer 21, and is reflected from the inner surface of the reflection layer 21. The reflected light exits from the observation side and is visually recognized by the observer, with the result that a reflection type display presented. The inner surface of the reflection layer 21 in this embodiment is a flat surface which does not have any scattering structure (ruggedness).

Next, the light shield layer 22 is formed in the shape of a grid so as to cover the interstice of the sub pixels 5 arrayed in the matrix shape (that is, a region where the common electrodes 11 and the segment electrodes 25 do not oppose each other), and it functions to shield the surroundings of the sub pixels 5 from light. The light shield layer 22 is formed of, for example, a black resinous material in which carbon black is dispersed, or a metal such as chromium (Cr).

The color filters 23 (23R, 23G and 23B) are resin layers which are disposed in correspondence with the respective sub pixels 5, and each of which is endowed with a color corresponding to its associated sub pixel 5, namely, any of red (R), green (G) and blue (B) by a pigment. Accordingly, the color filter 23 in each color selectively transmits light of a wavelength corresponding to the color. In this embodiment, there will be exemplified a case of adopting a construction (so-called "stripe array") wherein the color filters 23 of the same colors are respectively arrayed over the plurality of sub pixels 5 which form columns in the extending direction of the segment electrodes 25.

Figure 3:
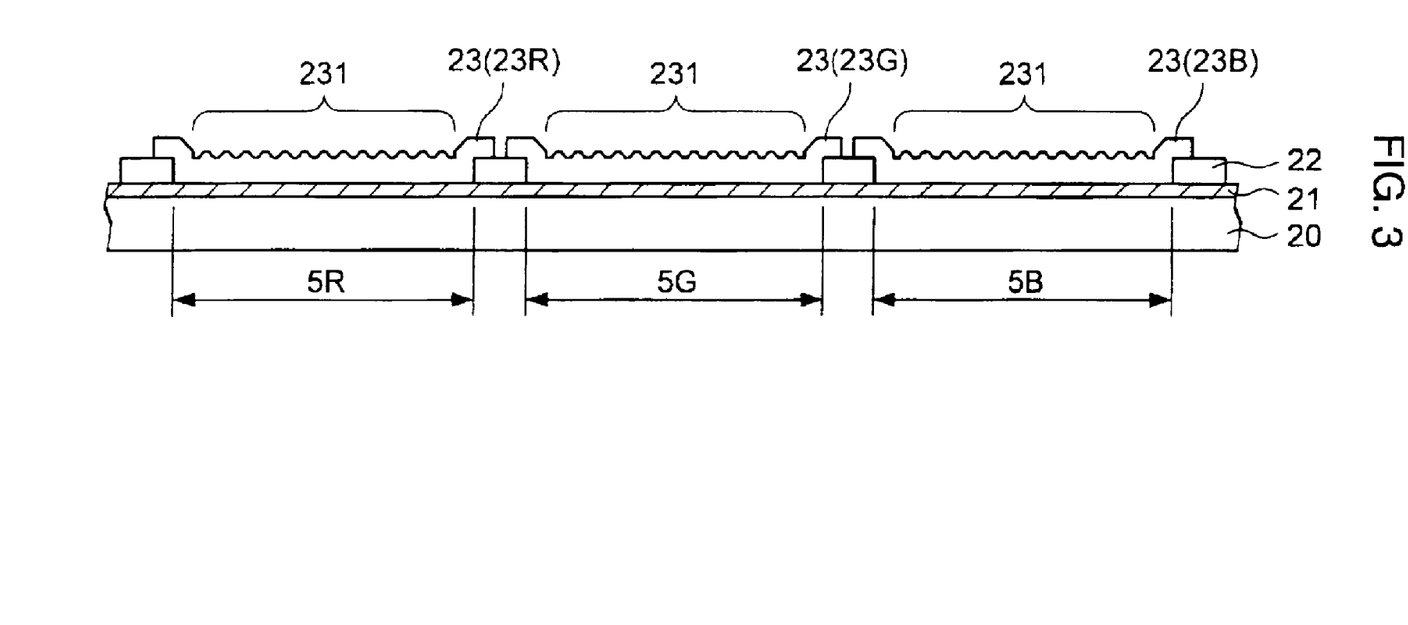
FIG. 3 is a cross sectional view showing the color filters of the liquid crystal display panel on an enlarged scale.
Figure 4:
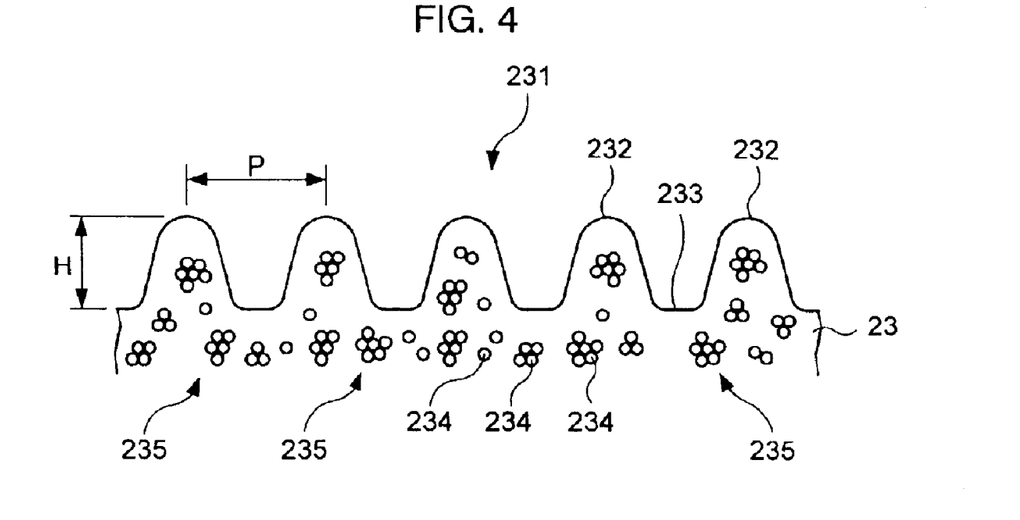
FIG. 4 is a cross sectional view showing one color filter of the liquid crystal display panel on an enlarged scale.

Here, FIG. 3 is a cross sectional view showing the color filters 23 on an enlarged scale, while FIG. 4 is a cross sectional view showing part of one color filter 23 on a more enlarged scale. As shown in these figures, the inner surface of the color filter 23 in each color is a smooth rough surface 231 which has a large number of ridges (convex parts) 232 and valleys (concave parts) 233. The ridges 232 and the valleys 233 are distributed at random positions in the inner surface of the color filter 23. Here, as shown in FIG. 4, letting a pitch P denote a distance from the top of one ridge 232 in the inner surface of the color filter 23, to that of the other ridge 232 adjacent the pertinent ridge 232 (in other words, a distance from the bottom of one valley 233 to that of the other valley 233 adjacent the pertinent valley 233), the mean value of the pitches P in the whole surface of the color filter 23 is 6.5 $\mu$m to 7.5 $\mu$m or so. Also, letting a height H denote a distance to the top of the ridge 232 with respect to the bottom of the valley 233 (in other words, a distance to the bottom of the valley 233 with respect to the top of the ridge 232), the mean value of the heights H in the whole surface of the color filter 23 is 9 $\mu$m or so.

Meanwhile, pigment particles 234 corresponding to each color are dispersed in the color filter 23. Further, as shown in FIG. 4, some of the pigment particles 234 constitute pigment particle groups 235. Each of the pigment particle groups 235 has the plurality of pigment particles 234 aggregated therein, and has a diameter of about 0.1 $\mu$m. Here, the aggregation of the pigment particles 234 will be detailed.

Figure 6:
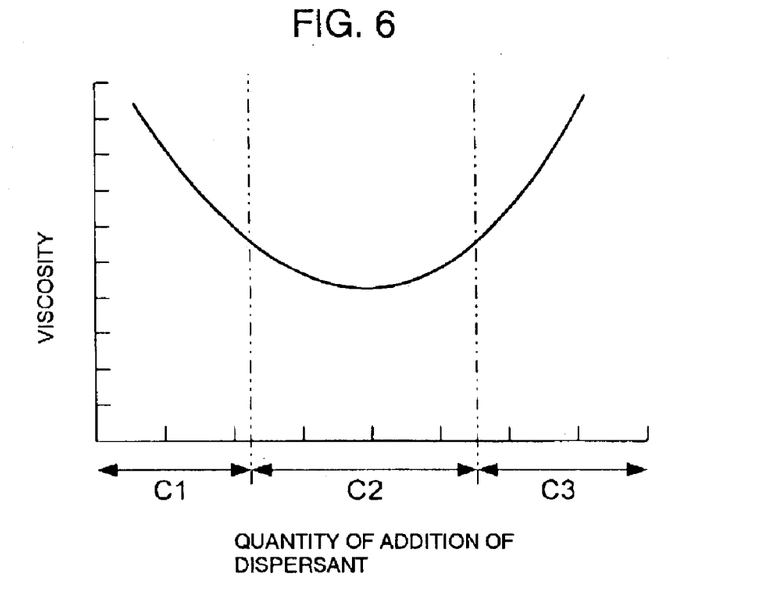
FIG. 6 is a graph showing the general relationship between the viscosity of a color filter forming liquid composite and the quantity of addition of a dispersant.
Figure 7:
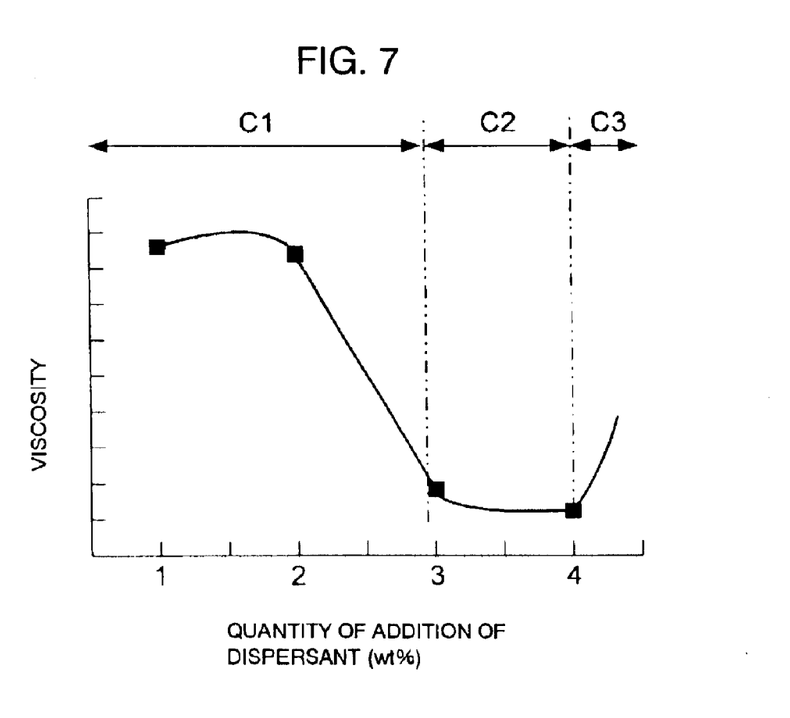
FIG. 7 is a graph showing the measured results of the viscosity of the color filter forming liquid composite and the quantity of addition of the dispersant.

When each color filter 23 is to be formed of a resin material in which the pigment particles 234 are dispersed, ordinarily a dispersant is mixed into the resin material in order to properly disperse the pigment particles 234 in the resin material. Here, FIG. 6 is a graph showing the general relationship between the viscosity of the resin material in which the pigment particles 234 and the dispersant are mixed (hereinbelow, expressed as the "color filter forming liquid composite") and the quantity of addition of the dispersant, while FIG. 7 is a graph showing the measured results of the viscosity of the color filter forming liquid composite and the quantity of addition of the dispersant. In each of these graphs, the quantity of addition of the dispersant and the viscosity of the color filter forming liquid composite are respectively indicated on the axis of abscissas and the axis of ordinates. The quantity of addition of the dispersant is indicated in terms of weight percentage (wt %) relative to the color filter forming liquid composite.

As shown in FIG. 6, when the quantity of addition of the dispersant is increased, generally the viscosity of the color filter forming liquid composite shows a tendency to initially continue decreasing from a comparatively high value and to subsequently reach a minimum value and turn to rise. In practical terms, as shown in FIG. 7, when the quantity of addition of the dispersant is gradually increased from an excessively small quantity of about 1 wt %, the viscosity of the color filter forming liquid composite exhibits the characteristic of continuing to decrease until an addition quantity of about 3 wt % is reached, subsequently becoming the minimum value at an addition quantity of about 3.5 wt %, and turning to rise after an addition quantity of about 4 wt % is exceeded.

In the ensuing description, as shown in FIGS. 6 and 7, the quantity of addition of the dispersant shall be divided into three intervals in accordance with the aspects of the viscosity change of the color filter forming liquid composite, and the respective intervals shall be expressed as the "first interval C1", "second interval C2" and "third interval C3". That is, the first interval C1 is an interval in which the viscosity of the color filter forming liquid composite is high on account of the excessively small quantity of the dispersant, the second interval C2 is an interval in which the viscosity of the color filter forming liquid composite becomes the minimum value or near it, and the third interval C3 is an interval in which the viscosity of the color filter forming liquid composite rises on account of the excessively large quantity of the dispersant.

Figure 5:
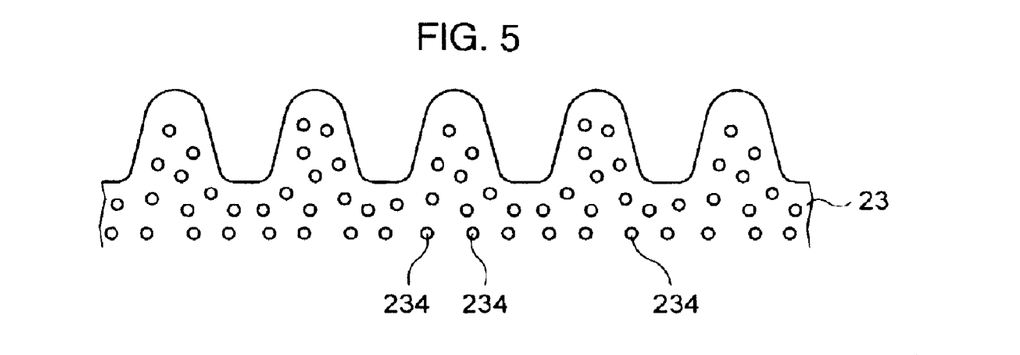
FIG. 5 is a cross sectional view showing a color filter formed of a color filter forming liquid composite in which the quantity of addition of a dispersant is different, on an enlarged scale as a comparative example of the color filter shown in FIG. 4.

Here, FIG. 5 is a view showing a color filter 23 formed of the color filter forming liquid composite in which the quantity of addition of the dispersant is set at a value within the second interval C2, as an example to be compared with the color filter 23 shown in FIG. 4. As shown in FIG. 5, when the quantity of addition of the dispersant is set at the value within the second interval C2, the individual pigment particles 234 are properly dispersed without aggregating to one another, and they are uniformly distributed in the color filter 23. In contrast, the color filter 23 according to this embodiment as shown in FIG. 4 is formed of the color filter forming liquid composite in which the quantity of addition of the dispersant is set at a value within the first interval C1. By setting the quantity of addition of the dispersant at the value within the first interval C1 in this manner, the plurality of pigment particles 234 aggregate to constitute each pigment particle group 235.

When the color filter 23 in which the pigment particles are not aggregated as shown in FIG. 5 is illuminated by light, the light transmitted through the color filter 23 is hardly scattered, whereas when the color filter 23 which has the pigment particle groups 235 with the pluralities of pigment particles 234 aggregated as shown in FIG. 4 is illuminated by light, the light transmitted through the color filter 23 is scattered. Such a difference is considered to be ascribable to reasons stated below. The light entering the color filter 23 (FIG. 5) in which the pigment particles 234 are uniformly distributed is scattered due to the difference of the refractive indices of the resin material and the pigment particles 234 when it is transmitted through the pigment particles 234 in the color filter 23. However, the scattered light rays similarly exiting from the respective pigment particles 234 in uniform distribution cancel each other, with the result that the light exiting from the color filter 23 is hardly scattered. In contrast, the light entering the color filter 23 which has the pigment particle groups 235 is scattered when it is transmitted through the pigment particles 234 constituting the pigment particle groups 235. Herein, the mutual cancellation of the scattered light rays is suppressed due to the uneven distribution of the pigment particles 234 in the color filter 23, with the result that the light exits as scattered light from the color filter 23.

Further, when the color filter 23 whose inner surface is roughened is illuminated by the light, the light scattered by being transmitted through the pigment particle groups 235 exits from the color filter 23 with the degree of scattering increased. In practical terms, the color filter 23 whose inner surface was roughened as shown in FIG. 4, and a color filter 23 whose inner surface was flat (not roughened) were fabricated by employing the color filter forming liquid composite in which the pigment particles 234 were aggregated, and the optical characteristics of the respective color filters were investigated. As a result, it has been revealed that, according to the color filter 23 of the roughened inner surface, a haze value higher than the color filter 23 of the flat inner surface is attained. More specifically, the difference of the haze values on the order of 70 (%) to 80 (%) has been noted between the color filter 23 of the roughened inner surface and the color filter 23 of the flat inner surface. That is, by bringing the inner surface of the color filter 23 into the rough surface 231 as shown in FIG. 4, the light exiting from the color filter 23 can be scattered more than the construction in which the pigment particles 234 are merely aggregated without roughening the inner surface.

Here, the "haze value" is a value representing a degree to which light having entered a certain sample is scattered during its transmission through the sample, and it is defined by the following formula (JIS (Japanese Industrial Standards) K6714-1977):

Haze value H=(Scattered-light transmission factor Td/Total light-rays transmission factor Tt)×100 (%)

Here, the "total light-rays transmission factor Tt" is a value which indicates the proportion of the quantity of light transmitted through the sample (here, the color filter 23), in the quantity of light having entered the light, while the "scattered-light transmission factor Td" is a value which indicates the proportion of the quantity of light exiting in directions other than a predetermined direction (namely, the quantity of scattered light), in the quantity of the light transmitted through the sample when the sample has been illuminated by the light in the predetermined direction. It can accordingly be said that, if the haze value H is high, the degree of the scattering is high, whereas if the haze value H is low, the degree of the scattering is low.

As described above, according to this embodiment, the pigment particles 234 in the color filter 23 are aggregated, and the inner surface of the color filter 23 is roughened, so that the light exiting from the liquid crystal display panel 1a can be sufficiently scattered by the color filters 23. Accordingly, a good display quality with the mirroring of a background suppressed can be attained without requiring the step of forming minute ruggedness in the inner surface of the second substrate 20 (in order to form ruggedness in the inner surface of the reflection layer 21), or the step of separately forming a layer for scattering light.

Method of Manufacturing Liquid Crystal Display Panel

Next, a method of manufacturing the liquid crystal display panel 1a according to this embodiment will be described with reference to FIGS. 8 and 9. The individual elements on the first substrate can be fabricated using various known techniques and therefore be omitted from description, and methods of fabricating the individual elements on the second substrate 20 are chiefly described below.

First of all, a thin film of metal having a light reflectivity is formed by employing sputtering or the like so as to cover the whole area of that surface of the second substrate 20 which is to oppose the first substrate 10. Thereafter, the thin film is patterned by employing photolithographic and etching techniques, to thereby form a reflection layer 21 shown in FIG. 8(a). Subsequently, a thin film made of chromium (Cr) is formed by sputtering or the like so as to cover the second substrate 20 formed with the reflection layer 21. Thereafter, this thin film is patterned by employing photolithographic and etching techniques, whereby a grid-shaped light shield layer 22 placed on the interstice of the individual sub pixels 5 is formed as shown in FIG. 8(b). Although the light shield layer 22 has been formed of the chromium here, it may well be formed using a resin material which is colored black by carbon black. Also, the light shield layer 22 may well be formed in such a way that color filters 23 for three colors, to be formed by later steps are stacked on the interstitial parts of the individual sub pixels 5.

Subsequently, as detailed below, the color filters 23 of the three colors of red, green and blue are successively formed on the surface of the resulting second substrate 20. Incidentally, although the color filters are formed in the order of the red ones 23, the green ones 23 and the blue ones 23 here, it is not intended to restrict the order of forming the color filters 23 of the respective colors thereto.

Figure 8:
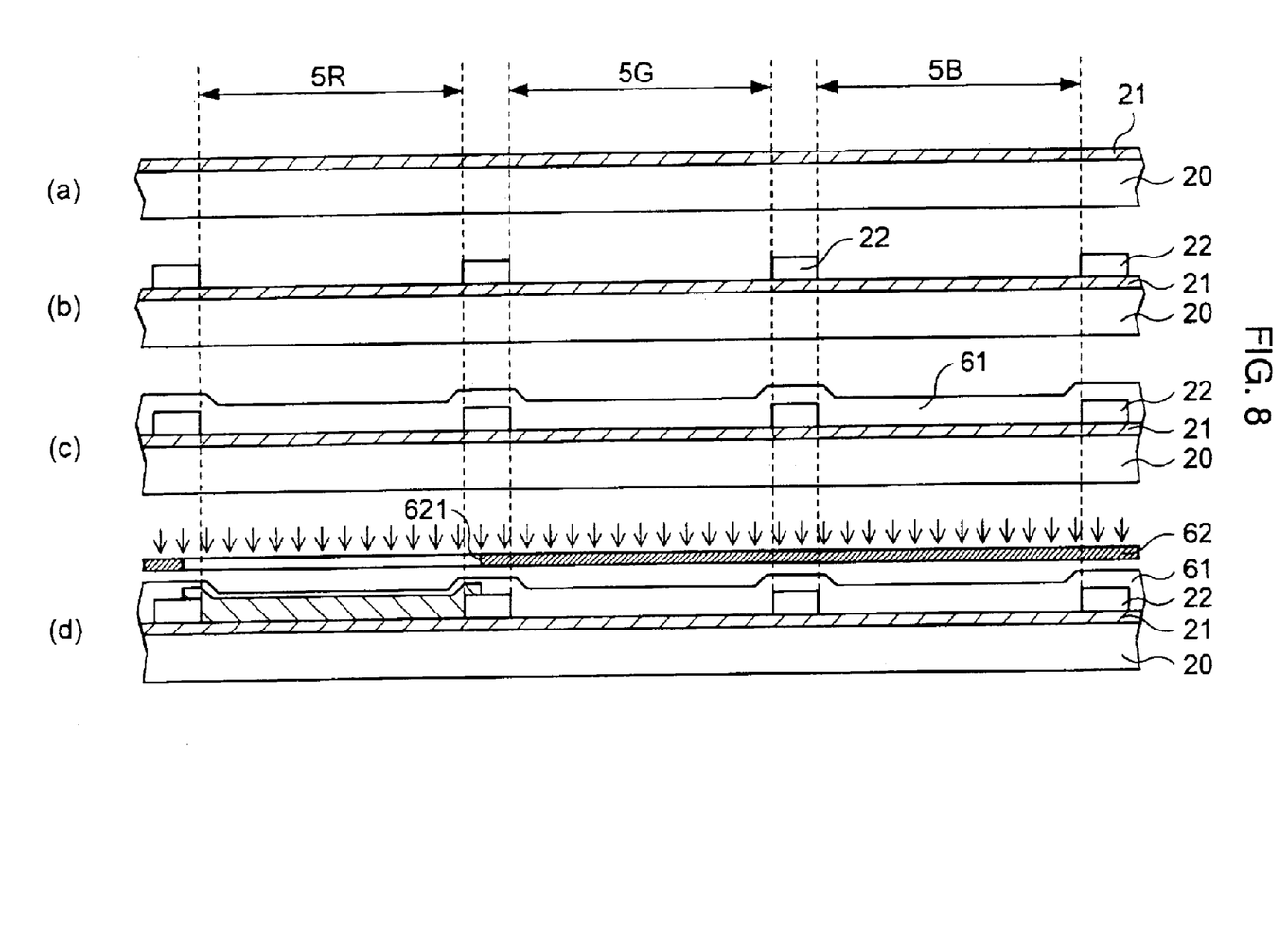
FIG. 8 is a cross sectional view showing a manufacturing process for the liquid crystal display panel.

First, as shown in FIG. 8(c), a resin layer 61 is formed in such a way that the surface of the second substrate 20 is coated by spin coating or the like with a color filter forming liquid composite whose basic material is a resin material of acryl or epoxy and which contains a dispersant and a red pigment. As stated before, the quantity of addition of the dispersant in the color filter forming liquid composite is adjusted to the quantity of addition within the first interval C1 shown in FIGS. 6 and 7. Accordingly, the pigment particle groups 235 each consisting of the plurality of pigment particles 234 aggregated are included in the resin layer 61. It is assumed here that the resin layer 61 be formed using the color filter forming liquid composite which contains as its basic resin a negative type resin material adapted to be hardened by a photoreaction upon exposure. Materials which can be used as pigment are azo lake, condensed azo, quinacridone, isoindolinone, perinon, perilene, insoluble azo, phthalocyanine, dioxazine, anthraquinone, thioin or the like materials. Materials which can be used as dispersant are magnesium stearate, aluminum stearate, calcium stearate, barium stearate, zinc stearate or polyethylene wax, organic materials such as polyoxyethylene alkylphenyl ether, polyethylene glycol diester, sorbitan fatty acid ester, fatty acid-modified polyester or tertiary amine-modified polyurethane, or the like.

Subsequently, as shown in FIG. 8(d), the resin layer 61 is irradiated with ultraviolet rays through a mask 62. As shown in the figure, the mask 62 is formed with a window 621 which transmits the ultraviolet rays, so as to lie over each region where the red color filter 23R is to be formed in the resin layer 61 (that is, each region corresponding to the sub pixel 5R). Further, the quantity of exposure to the ultraviolet rays is adjusted so that only part of the resin layer 61 in the thickness direction thereof may be hardened by the photoreaction, in other words, that the resin layer 61 may not be hardened entirely in the thickness direction. In FIG. 8(d), that part of the resin layer 61 which has been hardened by the exposure step is hatched.

Figure 9:
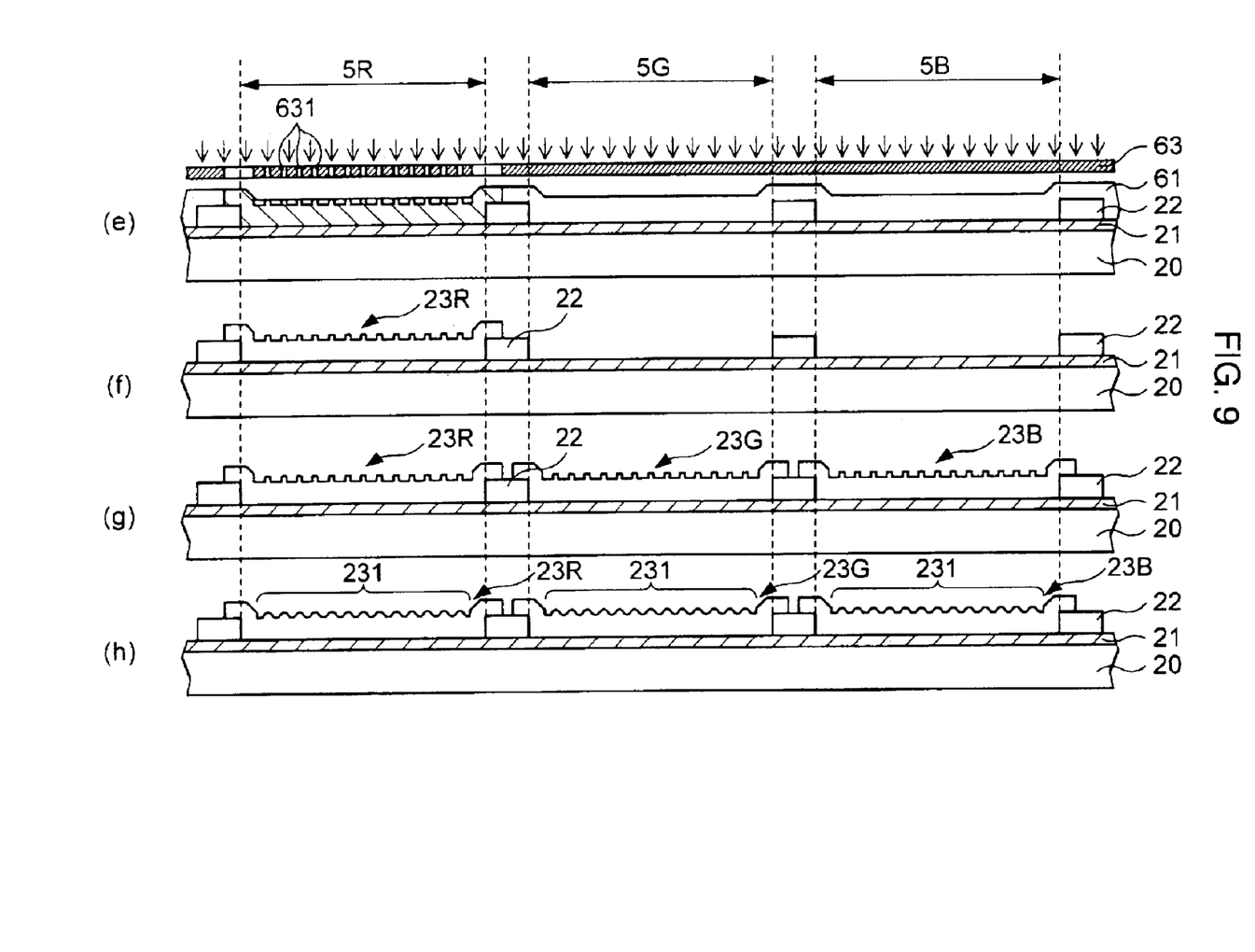
FIG. 9 is a cross sectional view showing the manufacturing process for the liquid crystal display panel.

Subsequently, as shown in FIG. 9(e), the resin layer 61 is irradiated with ultraviolet rays through a mask 63 which is different from the mask 62. As shown in the figure, the mask 63 is formed with windows 631 so as to lie over regions which are to become the ridges 232, in the region where the red color filter 23R is to be formed. After the exposure step, accordingly, those regions of the resin layer 61 which are to become the ridges 232 in the inner surface of the color filter 23 are hardened as indicated by hatching in FIG. 9(e).

Subsequently, the resin layer 61 is developed, to thereby remove the resin layer 61 except its part hardened by the exposure steps. At the development step, as shown in FIG. 9(f), the part of the resin layer 61 except the red color filter 23R is removed, and regions corresponding to the valleys 233 in the inner surface of the red color filter 23R are removed partially in the thickness direction of the resin layer 61. As a result, the red color filter 23R whose inner surface is the rough surface having the ridges 232 and the valleys 233 is obtained.

Thereafter, the green and blue color filters 23G and 23B are successively formed by steps similar to those shown in FIGS. 8(c) and (d), and FIGS. 9(e) and (f). By repeating the series of steps, the red, green and blue color filters 23R, 23G and 23B having the ridges 232 and the valleys 233 in their inner surfaces are obtained as shown in FIG. 9(g).

Subsequently, the color filters 23 are heated to or above the thermal deformation temperature thereof. The inner surfaces of the color filters 23 are softened by the heating, and the corners of the ridges 232 and the valleys 233 are rounded by the thermal deformation of the surfaces. As a result, the inner surfaces of the color filters 23 become the rough surfaces 231 having the smooth ridges 232 and valleys 233 as shown in FIG. 9(h).

Subsequently, the resulting second substrate 20 is coated with a resin material of epoxy, acryl or the like by spin coating or the like, and the resin material is thereafter baked, to thereby form the overcoat layer 24. Further, the segment electrodes 25 made of ITO are formed on the surface of the overcoat layer 24, and the orientation film 26 is formed so as to cover the segment electrodes 25 and is subjected to rubbing.

The above is the method of fabricating the individual elements on the second substrate 20. Thereafter, the second substrate 20 obtained by this method, and the first substrate 10 formed with the common electrodes 11 and the orientation film 12 are held together with the sealing member 31 in a state where their surfaces formed with the electrodes oppose each other. Also, the liquid crystal 32 is injected through an opening 211 provided in the sealing member 31, followed by closing the opening, and the phase difference plate 101 and the polarization plate 102 are bonded onto the first substrate 10. Thus, the liquid crystal display panel 1a shown in FIG. 1 is obtained.

In this manner, with the manufacturing method according to this embodiment, the structure for scattering the exiting light from the liquid crystal display panel 1a is formed simultaneously with the formation of the color filters 23. Accordingly, the invention can simplify the manufacturing process as compared with that in the case of forming the light scattering layers separately from the color filters 23. In turn, it has the advantage that the cost of manufacture can be suppressed.

Second Embodiment

Next, the construction of a liquid crystal display panel according to the second embodiment of the present invention will be described with reference to FIG. 10. Incidentally, among various portions shown in FIG. 10, ones common to the liquid crystal display panel 1a according to the foregoing first embodiment as shown in FIG. 1 are assigned the same symbols.

In the foregoing embodiment, there has been exemplified the construction in which the color filters 23, light shield layer 22 and overcoat layer 24 are formed on the surface of the second substrate 20 located on the rear side. In contrast, in the liquid crystal display panel 1b according to this embodiment, these elements are disposed on the surface of the first substrate 10 located on the observation side, as shown in FIG. 10.

More specifically, that surface of the first substrate 10 which opposes the liquid crystal 32 is overlaid with the light shield layer 22 which is placed on the interstitial parts of the individual sub pixels 5, and the color filters 23 each of which is endowed with any color of red, green or blue by the pigment. The color filter 23 in this embodiment is the same as the color filter 23 shown in FIGS. 3 and 4, and the inner surface thereof is the rough surface 231 which consists of the minute ridges 232 and valleys 233, while the pigment particle groups 235 in each of which the plurality of pigment particles 234 are aggregated are dispersed therein.

Figure 10:
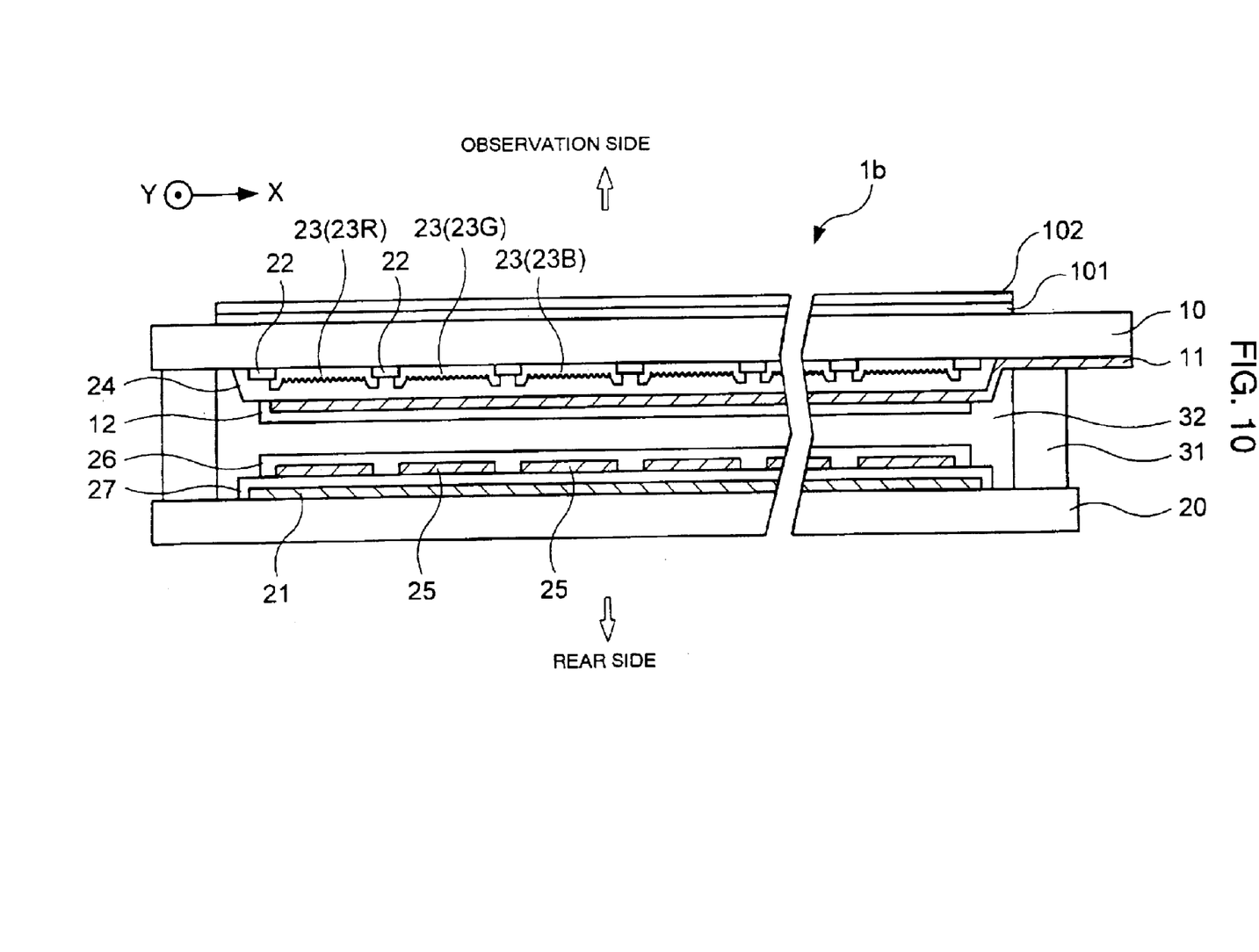
FIG. 10 is a cross sectional view showing the construction of a liquid crystal display panel according to the second embodiment of the present invention.

Further, as shown in FIG. 10, the inner surface of the first substrate 10 which is formed with the color filters 23 and the light shield layer 22 is covered with the overcoat layer 24. Also, the common electrode 11 is disposed on the inner surface of the overcoat layer 24, and the orientation film 12 is formed so as to cover the overcoat layer 24. Incidentally, the color filters 23 of the liquid crystal display panel 1b according to this embodiment is fabricated by the same process as described with reference to FIGS. 8 and 9 in the foregoing first embodiment.

On the other hand, the reflection layer 21 disposed on the inner surface of the second substrate 20 is covered with an insulating layer 27 which is made of a resin material or the like. The segment electrodes 25 and the orientation film 26 are disposed on the surface of the insulating layer 27.

In this manner, even with the construction in which the color filters 23 are disposed on the first substrate 10 located on the observation side, the same effects as in the first embodiment are attained. That is, the "color filter board" according to the present invention signifies the substrate having the color filters 23 each of which is formed of the resin material including the pigment particle groups 235 each consisting of the plurality of aggregated pigment particles 234 and each of which has its inner surface roughened, irrespective of whether the substrate is arranged on the observation side or the rear side.

Modified Embodiments

Although the embodiments of this invention have been described above, they are only examples, and they can be variously modified within a scope not departing from the purport of the present invention. Considered as modified embodiments are, for example, as stated below.

Modified Embodiment 1

Figure 11:
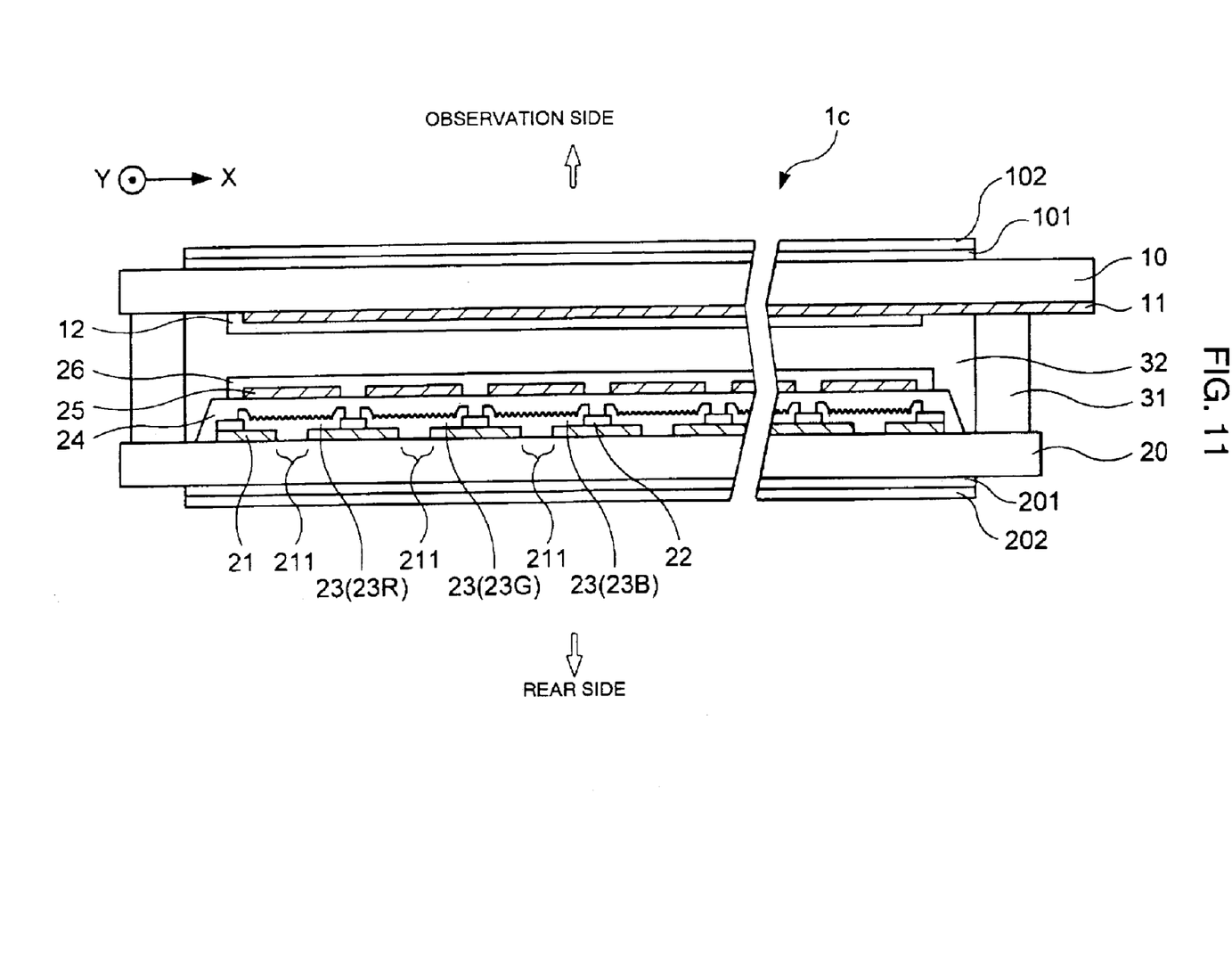
FIG. 11 is a cross sectional view showing the construction of a liquid crystal display panel of semitransmissive reflection type according to a modified embodiment of the present invention.
Figure 12:
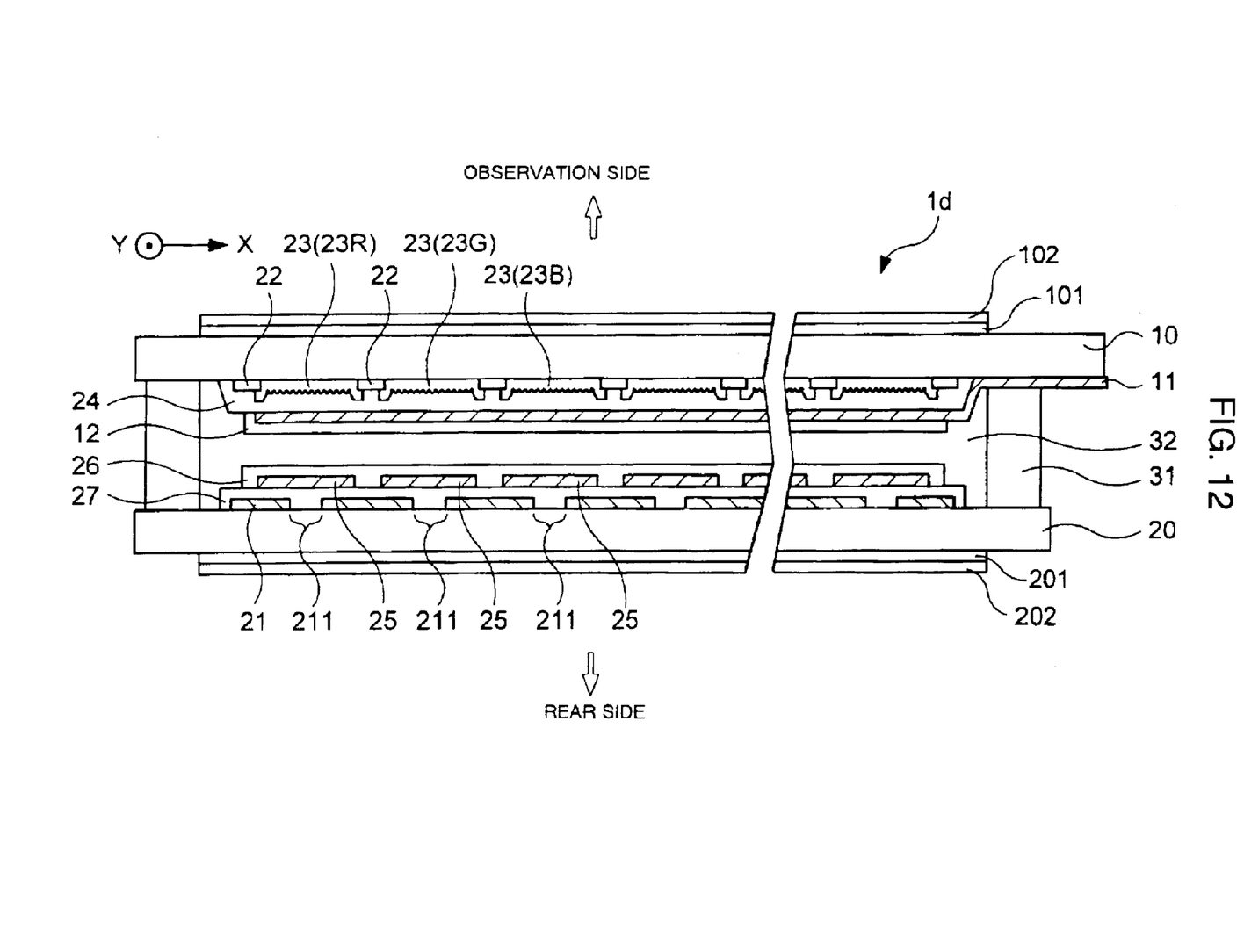
FIG. 12 is a cross sectional view showing the construction of a liquid crystal display panel of semitransmissive reflection type according to a modified embodiment of the present invention.

Although the liquid crystal display panels 1a and 1b of reflection type have been exemplified in the foregoing embodiments, the present invention is also applicable to a liquid crystal display panel of semitransmissive reflection type which is capable of transmission type display in addition to reflection type display. More specifically, a liquid crystal display panel 1c shown in FIG. 11 by way of example is constructed so that a reflection layer 21 having openings 211 is disposed instead of the reflection layer 21 of the liquid crystal display panel 1a as shown in FIG. 1, and that a phase difference plate 201 and a polarization plate 202 are bonded on the inner surface of the second substrate 20. According to this construction, light entering from the side of the first substrate 10 is reflected from the inner surface of the reflection layer 21 (except the openings 211), to thereby perform the reflection type display, while light projected from a backlighting unit (not shown) arranged on the rear side exits from the observation side by passing through the openings 211 of the reflection layer 21, to thereby realize the transmission type display. Likewise, a liquid crystal display panel 1d shown in FIG. 12 is constructed so that a reflection layer 21 having openings 211 is disposed instead of the reflection layer 21 of the liquid crystal display panel 1b as shown in FIG. 10, and that a phase difference plate 201 and a polarization plate 202 are bonded on the inner surface of the second substrate 20. Also with this construction, the reflection type display and the transmission type display can be properly changed-over as in the liquid crystal display panel 1c shown in FIG. 11. Even with the liquid crystal display panels 1c and 1d of semitransmissive reflection type as respectively shown in FIGS. 11 and 12, the same effects as in the foregoing embodiments can be attained by employing the color filters 23 which include the pigment particle groups 235 and whose inner surfaces are roughened.

Incidentally, this modified embodiment is constructed so that both the reflection type display and the transmission type display are realized by the reflection layer 21 having the openings 211, but the present invention is also applicable to a liquid crystal display panel of semitransmissive reflection type in which such a reflection layer 21 is replaced with a so-called "semitransparent mirror" adapted to transmit part of illuminating light and to reflect the other part.

Modified Embodiment 2

In the embodiments and modified embodiment described above, there has been exemplified the case where the pigment particle groups 235 in each of which the pigment particles 234, corresponding to each of the colors of the color filters, are aggregated are employed as the particle groups for scattering the light transmitted through the color filters. However, the color filter according to the present invention is not restricted to the case, but particle groups in each of which particles distinct from the pigment particles are aggregated may well be dispersed in the color filter. Usable as the particles of the separate type are, for example, particles made of acrylic resin materials, or particles made of an inorganic oxide material such as $SiO_2$ or ITO (Indium Tin Oxide).

Modified Embodiment 3

In the foregoing embodiments, there have been exemplified the liquid crystal display panels of the passive matrix scheme having no switching element. Needless to say, however, the present invention is also applicable to a liquid crystal display panel of active matrix scheme which includes a two-terminal type switching element represented by TFD (Thin Film Diode), or a three-terminal type switching element represented by TFT (Thin Film Transistor). Also, in the foregoing embodiments, there has been exemplified the construction adopting the stripe array in which the color filters 23 of the identical color form one column, but a mosaic array or a delta array can be alternatively adopted as the aspect of the array of the color filters 23. In this manner, insofar as the color filter board formed with the color filters 23 and the liquid crystal display panel employing this color filter board are concerned, the present invention is applicable without regard to aspects relating to the other constituents.

Electronic Equipment

Next, electronic equipment each of which employs the liquid crystal display panel according to the present invention will be described.

Mobile Computer

Figure 13:
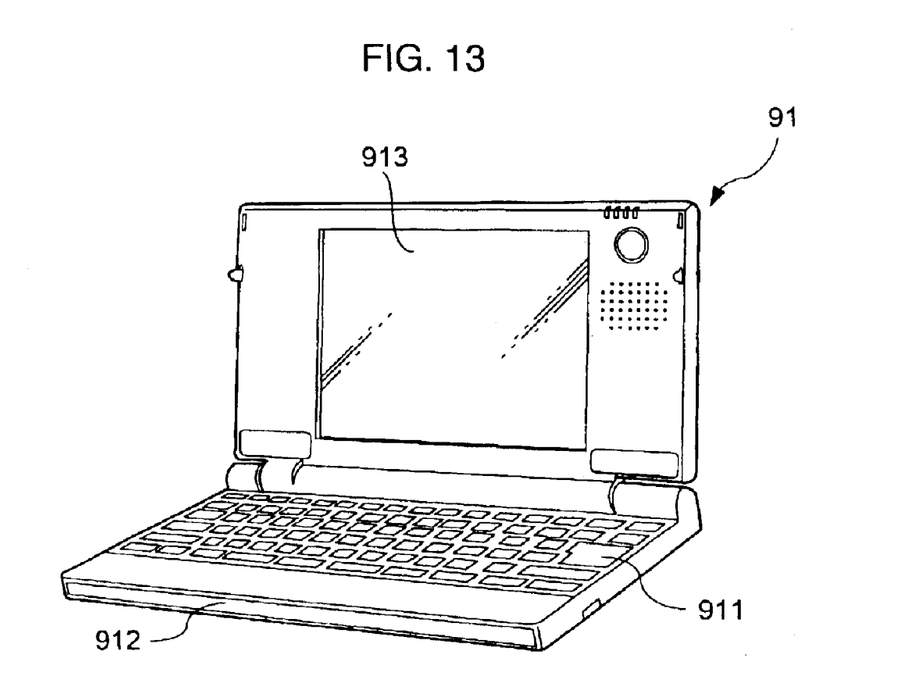
FIG. 13 is a perspective view showing the construction of a personal computer which is an example of electronic equipment employing the liquid crystal display panel according to the present invention.

First, there will be described an example in which the liquid crystal display panel according to the present invention is applied to the display unit of a portable type personal computer (so-called "notebook-sized personal computer). FIG. 13 is a perspective view showing the construction of this personal computer. As shown in the figure, the personal computer 91 includes the body 912 which is furnished with a keyboard 911, and the display unit 913 to which the liquid crystal display panel according to the present invention is applied. In such a personal computer, the liquid crystal display panel 1c or 1d of the semitransmissive reflection type (refer to FIG. 11 or FIG. 12) including the backlighting unit on the rear side should desirably be employed in order to ensure the visibility of a display even in an environment of insufficient external light.

Portable Telephone

Figure 14:
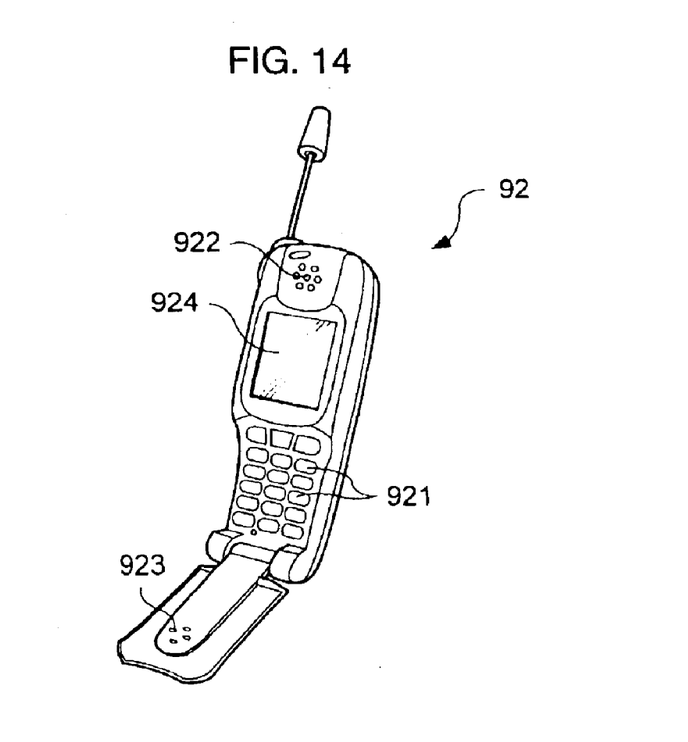
FIG. 14 is a perspective view showing the construction of a portable telephone which is an example of electronic equipment employing the liquid crystal display panel according to the present invention.

Subsequently, there will be described an example in which the liquid crystal display panel according to the present invention is applied to the display unit of a portable telephone. FIG. 14 is a perspective view showing the construction of this portable telephone. As shown in the figure, the portable telephone 92 includes a plurality of operating buttons 921 and an earpiece 922 as well as a mouthpiece 923, and the display unit 924 to which the liquid crystal display panel according to the present invention is applied. Also in the portable telephone of this type, the liquid crystal display panel 1c or 1d of the semitransmissive reflection type should desirably be employed in order to ensure the visibility of a display in a dark place.

Incidentally, apart from the personal computer shown in FIG. 13 and the portable telephone shown in FIG. 14, a liquid crystal television set, a video tape recorder of view finer type or monitor direct-view type, a car navigation system, a pager, an electronic notebook, a desktop calculator, a word processor, a workstation, a video telephone, a POS terminal, a digital still camera, etc. are mentioned as electronic equipment to each of which the liquid crystal display panel according to the present invention is applicable.

With the liquid crystal display panel according to the present invention, the mirroring of a background can be prevented by the simple construction, so that the display panel is especially suited to electronic equipment of which a good display quality and the curtailment of a manufacturing cost are required.

Advantage of the Invention

As described above, according to the present invention, light for use in display can be scattered by a simple construction.

The entire disclosure of Japanese Patent Application No. 2002-007184 filed Jan. 16, 2002 is incorporated by reference.

What is claimed is:

1. A color filter board comprising:
    a first substrate selected from a pair of substrates which oppose each other and between which a liquid crystal is sandwiched; and
    color filters disposed over said first substrate so as to transmit light of wavelengths corresponding to specified colors, each color filter including:
    an inner surface that is a rough surface having ridges and valleys;
    hardened resin; and
    dispersed particle groups each having a plurality of aggregated particles in the hardened resin.

2. The color filter board as defined in claim 1, wherein:
    each of the particle groups includes a plurality of pigment particles which correspond to a color of the corresponding color filter, and which are aggregated.

3. The color filter board as defined in claim 1, further comprising:
    a reflection layer disposed on said first substrate so as to reflect light entering from the other of the pair of substrates;
    said color filters being disposed on an inner surface of said reflection layer.

4. A liquid crystal display panel comprising:
    a pair of substrates which oppose each other, and between which a liquid crystal is sandwiched; and color filters disposed over one substrate of said pair of substrates so as to transmit light of wavelengths corresponding to specified colors, each color filter including:

an inner surface that is a rough surface having ridges and valleys;

hardened resin; and dispersed particle groups each having a plurality of aggregated particles in the hardened resin.

5. The liquid crystal display panel as defined in claim 4, wherein:

each of the particle groups includes a plurality of pigment particles which correspond to a color of the corresponding color filter, and which are aggregated.

6. The liquid crystal display panel as defined in claim 4, further comprising:

a reflection layer disposed on the other substrate of said pair of substrates so as to reflect light entering from the other substrate.

7. The liquid crystal display panel as defined in claim 4, further comprising:

a reflection layer disposed on said one substrate so as to reflect light entering from a side of the other substrate of said pair of substrates;

said color filters being disposed on an observation side with respect to said reflection layer.

8. The liquid crystal display panel as defined in claim 6, wherein:

said reflection layer has openings through which light entering from a rear side is transmitted to an observation side.

9. An electronic equipment comprising said liquid crystal display panel as defined in claim 4.

10. A method of manufacturing a color filter board having a substrate and color filters which transmit light of specified wavelengths, the method comprising:

the first step of forming the color filters over the substrate by the use of a color filter forming composite which includes particle groups each having a plurality of aggregated particles; and the second step of shaping an inner surface of each of the color filters formed by said first step, into a rough surface which has ridges and valleys.

11. The method of manufacturing a color filter board as defined in claim 10, wherein:

at said second step, a plurality of regions in the inner surface of each of the color filters formed by said first step are removed, to thereby shape the inner surface of said each color filter into the rough surface which has the valleys corresponding to the removed regions and the ridges corresponding to the other regions.

12. The liquid crystal display panel as defined in claim 7, wherein:

said reflection layer has openings through which light entering from a rear side is transmitted to an observation side.

13. A color filter board comprising:

a first substrate selected from a pair of substrates which oppose each other and between which a liquid crystal is sandwiched; and color filters disposed over said first substrate so as to transmit light of wavelengths corresponding to specific colors, each color filter including an inner surface that is a rough surface having a pattern of ridges and valleys.

14. The color filter board of claim 1, wherein said pattern of ridges and valleys is a repeating pattern of ridges and valleys.

15. A color filter board comprising:

a first substrate selected from a pair of substrates which oppose each other and between which a liquid crystal is sandwiched; and color filters disposed over said first substrate so as to transmit light of wavelengths corresponding to specified colors, each color filter including dispersed particle groups each having a plurality of fixed aggregated particles that scatter light entering the color filter.

16. The color filter board of claim 15, wherein:

each of the particle groups includes a plurality of pigment particles which correspond to a color of the corresponding color filter, and which are aggregated.

17. The color filter board of claim 15, wherein said dispersed particle groups are light scattering particle groups.

18. A method of manufacturing a liquid crystal panel including a color filter board, the color filter board including a color filter having a rough surface formed from ridges and valleys, the method comprising:

forming a resin layer of photoreaction resin, the resin layer including particle groups each having a plurality of aggregated particles;

irradiating with light the resin layer to harden the resin layer in a first portion in the thickness direction;

selectively irradiating with light the resin layer in a second portion that is on the first portion to harden the ridges; and removing portions of the resin layer other than those hardened by the irradiation and the selective irradiation.

* * * * *